June 6, 1944.   E. HORN   2,350,760
TRACK FOR TOY VEHICLES
Filed Aug. 23, 1940
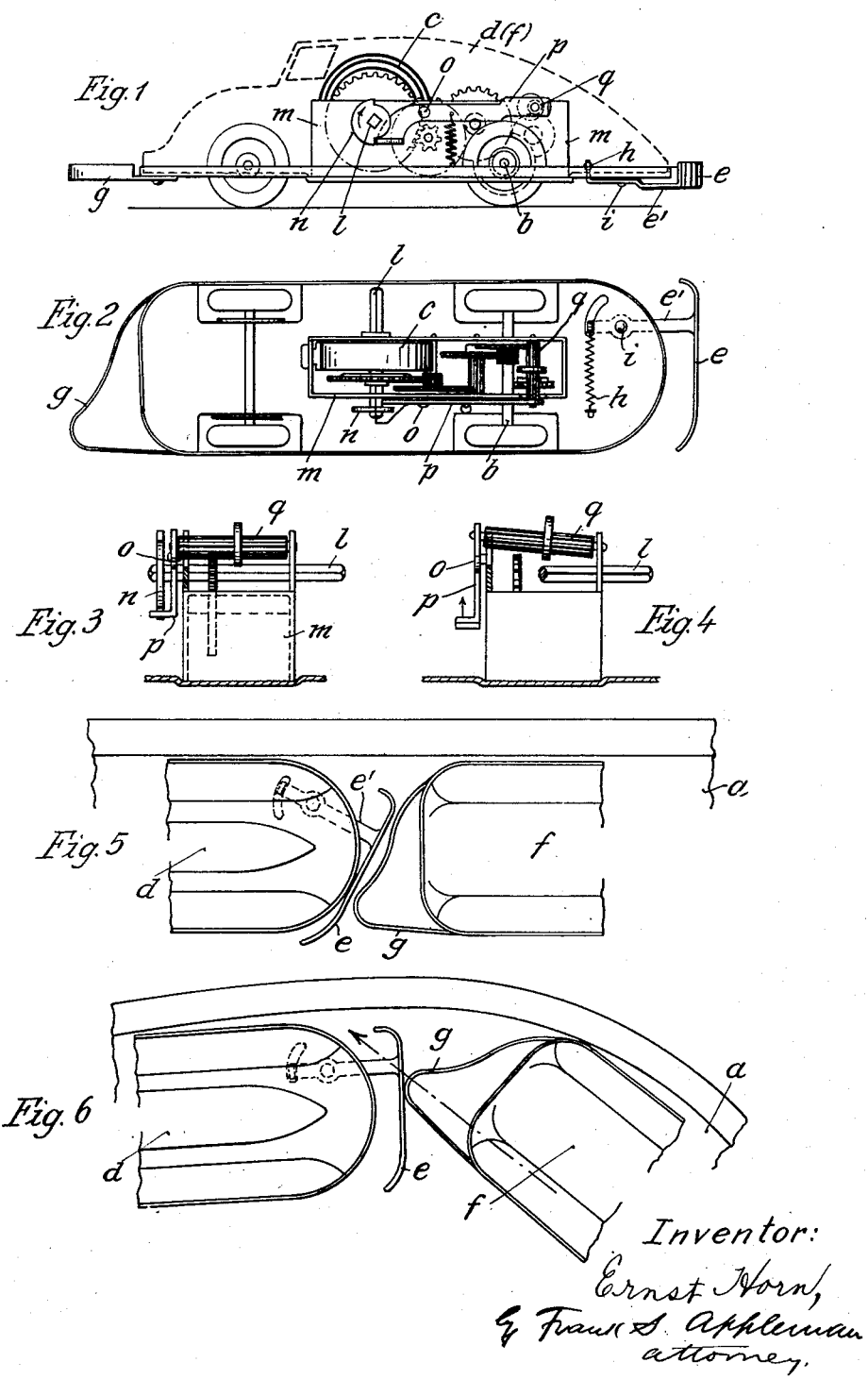
Inventor:
Ernst Horn,
by Frank S. Appleman
attorney.

Patented June 6, 1944

2,350,760

UNITED STATES PATENT OFFICE 2,350,760

TRACK FOR TOY VEHICLES

Ernst Horn, Nuremberg, Germany; vested in the Alien Property Custodian

Application August 23, 1940, Serial No. 353,973
In Germany January 22, 1940

5 Claims. (Cl. 46—201)

This invention relates to tracks for toy vehicles, such as toy automobiles, and has for its principal object to devise a track of this kind which is adapted to serve for toy vehicles of which one is overtaking the other, said vehicles including deflecting devices in the form of a push-rod mounted swingably about a fixed point of each vehicle and adapted to deflect the vehicle travelling at higher speed from its direction of travel, when overtaking another which is travelling at smaller speed in front of the same. In order to again carry the vehicle, after having overtaken the other, towards the elevated rim of the track, the latter is inclined in direction to the right-hand side with respect to the direction of travel.

According to my invention, now, the aforementioned track and toy vehicles are arranged in a novel manner permitting the vehicles of being driven at varying speed, so that they may alternately overtake each other in such a manner that at a time the one vehicle will be in front and at some other time in the rear of the other vehicle. By this novel arrangement there is created the impression of an automobile race in which case the automobiles alternately overtake one another.

In order to attain alternately varying speeds of the vehicles, according to my invention each vehicle is further provided with a switching device which is automatically controlled by the motion of the drive and acts onto the axle of the speed regulator. This switching device may, for instance, consist of a resiliently mounted lever, preferably a double-armed lever, controlled by a cam-shaft fast on the winding-up axle of the clockwork driving the vehicle, said lever forming a bearing for said axle and disengaging the latter from the drive, with the result that the clockwork will run off more rapidly.

In the accompanying drawing I have represented an example of the track and the vehicles constructed in accordance with my invention. In the drawing, Fig. 1 is a side-view of the carriage of a vehicle together with the clockwork driving the same, Fig. 2 a plan-view taken on Fig. 1, Figs. 3 and 4 are views showing details of the construction, Fig. 5 is a partly broken-away top-view of the two vehicles at the moment before overtaking on a straight track and Fig. 6 a similar view of the two vehicles at the moment before overtaking on a curved track.

Referring more particularly to the drawing, the vehicle is driven by a clockwork including a spring $c$ which may be wound-up by means of the winding-up axle $l$ mounted rotatably in the frame $m$ of the clockwork. The rear axle $b$ is being driven by the spring $c$ in known manner by way of an intermediate train of gear-wheels and pinions. The rear axle may be rotated at a greater or lesser speed, when the regulator axle $q$ is disengaged from or engaged with the clockwork, respectively. Said regulator axle $q$ is mounted at the end of a double-armed lever $p$, which on its part is mounted swingably about the axle $o$. The latter is mounted within the frame of the clockwork. The other end of said double-armed lever $p$ is controlled by means of a cam-disk $n$, said lever being pressed by action of a spring against the periphery of said cam-disk. The speed regulator axle $q$ will be engaged with the clockwork, as shown in Fig. 3 and, accordingly, the vehicle will travel at a smaller speed, as long as the end of said double-armed lever $p$ is resting on the part of the periphery of said cam-disk with the smaller diameter. On the other hand, the speed regulator axle $q$ will be disengaged from the clock-work and the latter, accordingly, rotate at a time at a greater speed, when the left-hand arm of the double-armed lever $p$ rests on the part of the periphery of the cam-disk with the greater diameter. The speed regulator axle $q$ may be operated in any desired manner to retard the unwinding of the spring mechanism. In the form of the invention shown, the axle $q$ is moved into engagement with one of the gear wheels of the spring actuated mechanism shown in Figures 3 and 4, and is resiliently pressed against said gear wheel by the spring actuated lever $p$, thereby retarding the turning of the gear wheel and the unwinding of the spring mechanism. The retarding action will depend on the strength of the spring engaging lever $p$. Due to the high gear ratio between the spring axle $l$ and the vehicle axle $b$, very little pressure or friction is required to slow up the gear train. In the form shown, the axle $q$ has longitudinal serrations which mesh with the teeth of the gear wheel. In practice, however, the speed control axle may frictionally engage any part of the gear train, or axles $b$ or $l$, to retard the unwinding of the spring mechanism, and need not mesh with one of the gear wheels to accomplish this result. Some retarding member other than a frictionally operating member may obviously be employed. When the speed control axle $q$ is disengaged from the gear train by the cam $n$, the clockwork mechanism will be relieved of the retarding influence of the speed control member and will increase the speed of rotation of the axle $b$.

As shown in Fig. 5, in which case the vehicles are in condition just before overtaking on a straight track a, the fixed push-rod g provided in front of the rear vehicle f will abut against the swingable push-rod e provided in the rear of the front vehicle d.

In condition of overtaking of the vehicles on a curved track a as shown in Fig. 6, the longitudinal axes of the two vehicles form an angle with each other and, accordingly, the swingable lever e at the end of the front vehicle d is not given a swinging motion, but pressed towards the right-hand side, when the push rod g of the rear vehicle f is abutting against the swingable lever e at the rear end of the front vehicle d.

Preferably, the cam-disks n on the winding-up axles for the clockworks of the vehicles are displaced against each other by an angle of about ninety degrees, with the result that the two vehicles will be travelling at different speeds. The two vehicles, accordingly, will alternately overtake each other, the cause proper for such alternate overtaking being not cognizable to the observer.

The movable deflecting member may be provided at the rear end and the fixed deflecting member at the front end of each vehicle. However, the said deflecting members may also be arranged in the opposite way, that is the movable deflecting member may be provided at the front end and the fixed deflecting member at the rear end of the vehicle. In every case the movable deflecting member is mounted with its arm e' swingable about the point i and will be kept in position of rest by means of a spring h. On the other hand, the fixed deflecting member is preferably inclined or provided with an elevated part, so that during contact with the movable deflecting member of a second vehicle travelling in front of it the lateral deflection of the vehicle travelling in the rear, may be performed with a minimum of friction or other obstruction.

I claim:

1. A toy vehicle track having two toy vehicles adapted to alternately overtake each other, each having a spring mechanism operatively engaging its driving axle, a switching device adapted to control the speed of rotation of the axle, and automatic means actuated by said spring mechanism to operate said switching device and vary the speed of the vehicle.

2. A toy vehicle track having an elevated rim and a pair of spring mechanism operated toy vehicles, each of said vehicles having a transverse deflecting bar pivotally connected to its rear end and adapted to be engaged by the forward end of the other vehicle to deflect the said other vehicle from its direction of travel, and means carried by each of said vehicles to alternately increase and decrease the speed thereof.

3. A toy vehicle track having two toy vehicles adapted to alternately overtake each other, each having a spring mechanism operatively engaging its driving axle, a switching device adapted to control the speed of rotation of the axle, and automatic means actuated by said spring mechanism to operate said switching device and vary the speed of the vehicle, said switching device comprising a resiliently mounted lever, a speed control member carried by the lever and adapted to be alternately connected and disconnected from said driving axle, and a cam operated by said spring mechanism to move the lever to connect and disconnect the speed control member from the driving axle.

4. A toy vehicle track having two toy vehicles adapted to alternately overtake each other, each having a spring mechanism operatively engaging its driving axle, a switching device adapted to control the speed of rotation of the axle, and automatic means actuated by said spring mechanism to operate said switching device and vary the speed of the vehicle, said switching device comprising a resiliently mounted double armed lever, a cam carried by the winding axle of the spring mechanism and engaging one arm of the lever, a speed regulator carried by the other arm of the lever and actuated by said cam and lever to alternately engage and disengage with said spring mechanism to vary the speed at which the driving axle is rotated, said cam of one of said vehicles being displaced by an angle of about ninety degrees with respect to the cam of the other vehicle, so that said vehicles will alternately overtake each other at varying speeds and at varying places on said track.

5. A toy vehicle track having an elevated rim and a pair of spring mechanism operated toy vehicles, each of said vehicles having a transverse deflecting bar pivotally connected to its rear end and adapted to be engaged by the forward end of the other vehicle to deflect the said other vehicle from its direction of travel, and means carried by each of said vehicles to alternately increase and decrease the speed thereof, and each of said vehicles having a deflecting member projecting from its forward end and having a transversely inclined deflecting surface adapted to engage the pivoted deflecting bar at the rear of the other vehicle.

ERNST HORN.